United States Patent

[11] 3,601,928

[72] Inventor Robert C. Miller
Poughkeepsie, N.Y.
[21] Appl. No. 862,754
[22] Filed Oct. 1, 1969
[45] Patented Aug. 31, 1971
[73] Assignee International Business Machines Corporation
Armonk, N.Y.

[54] ACCURATELY POSITIONABLE HIGH SPEED MACHINE TOOL
10 Claims, 7 Drawing Figs.

[52] U.S. Cl. .................................................. 51/165.8
[51] Int. Cl. .................................................. B24b 49/00
[50] Field of Search ........................................ 51/165 R, 165.77, 165.8, 165.9, 165.91, 165.92

[56] References Cited
UNITED STATES PATENTS
2,168,596 8/1939 Hall .............................. 51/111
FOREIGN PATENTS
911,982 12/1962 Great Britain ................ 51/165.77

Primary Examiner—Lester M. Swingle
Attorneys—Hanifin and Jancin and Henry E. Otto, Jr.

ABSTRACT: The position of a rapidly rotating tool relative to a work surface is very precisely controlled by driving the tool from a shaft that is eccentrically supported within bearings. The shaft and hence tool are movable in an arcuate path toward and away from the surface by gear means that can effect minute variations in rotative position of the bearings and hence in depth of penetration of the surface. A servo unit controls the gear means as necessary to maintain actual load on the tool equal to a predetermined load that corresponds to a desired position of the tool relative to the work surface. Actual load is sensed by a signal proportional to the rectified voltage corresponding, for example, to the input current to one phase of a three-phase motor that powers the tool; and desired position (depth of penetration) of the tool corresponds to a reference voltage predetermined to provide that position taking into account the physical characteristics of said surface. The actual position (depth of penetration) of the tool is sensed. The motor automatically is shut off if actual depth is low when actual load is high, indicating dulling of the tool.

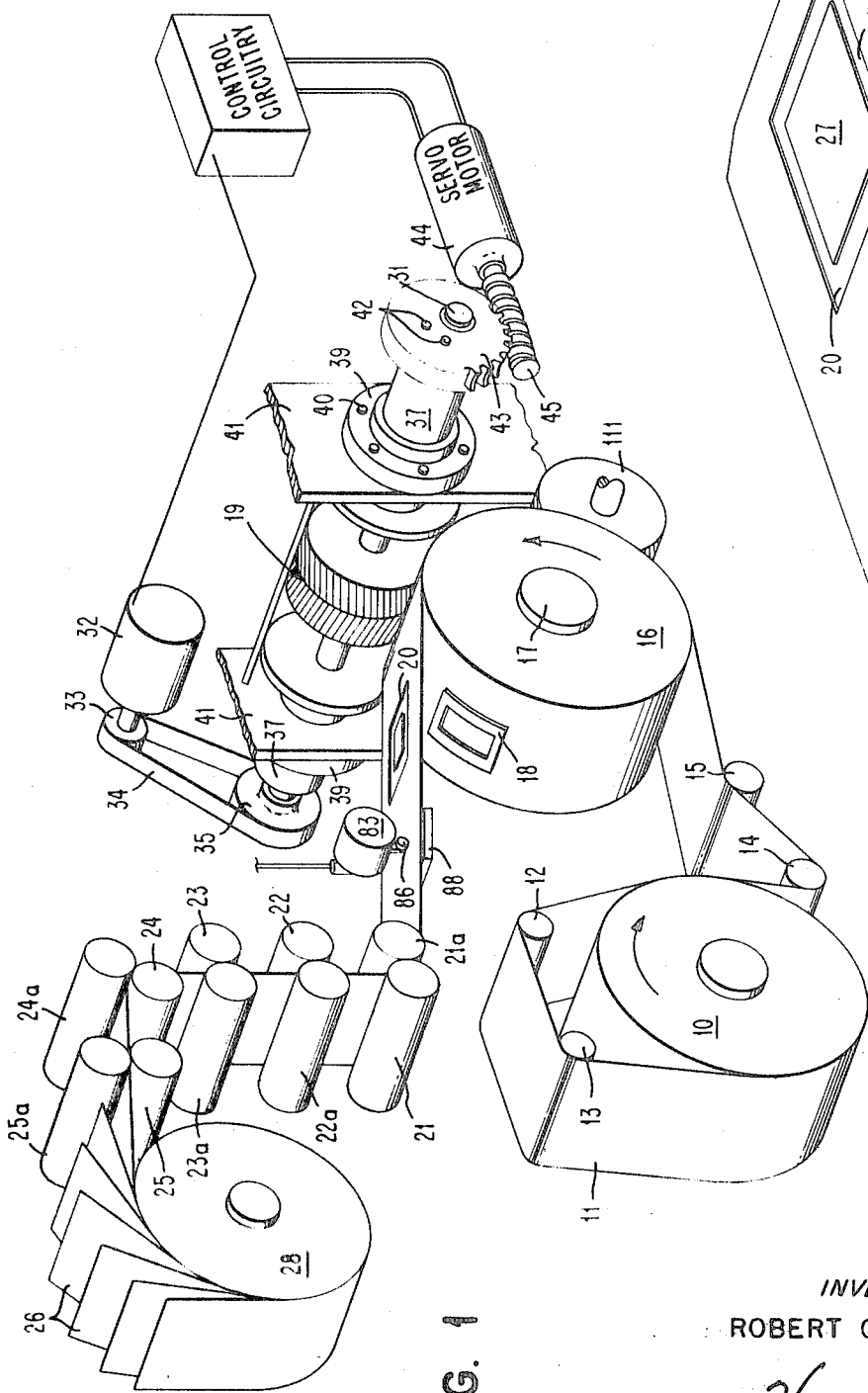

3,601,928

ACCURATELY POSITIONABLE HIGH SPEED MACHINE TOOL

This invention relates to high speed machine tools, and more particularly to those wherein the position of a rapidly rotating tool (such as an abrading wheel or grinding wheel) can be very accurately controlled so that a moving web, at longitudinally spaced areas, will be repetitively and consistently abraded or ground to substantially the same precise depth, but can be conditioned without shutdown to abrade or grind to a different depth.

BACKGROUND OF INVENTION

It has heretofore been proposed to manufacture aperture cards by passing a continuous web of 0.007 inch cardstock between a high-speed abrading wheel and a hollow rectangular die projecting from one portion of the periphery of a large diameter backup roll that is driven at a considerably lower speed. Difficulty has been experienced in accurately controlling the depth to which the cardstock is abraded. This is especially true when the cardstock is to be abraded to a depth of about 0.0055 inch to provide a hollow rectangular shoulder of only about 0.0015 inch to support a chip of a silver halide master film within the aperture and flush with the surface of the card.

There is need for apparatus that can repetitively abrade a rapidly moving web at predetermined intervals consistently to the same precise depth.

SUMMARY OF INVENTION

Toward this end and according to the invention, there is provided a machine tool including such as an abrading wheel or a grinding wheel, that while rotating at speeds of the order of 12,000 revolutions per minute, is rendered capable of controlling depth of abrade or grind to very close tolerances of the order of about ±0.0002 inch. The drive shaft for the high speed wheel is eccentrically supported in a bearing to provide a simple and compact reduction mechanism which can be readily replaced as a module or unit and is readily and precisely controllable by a servomechanism. This apparatus automatically compensates for changes in temperature of the wheel and abrades successive uniformly spaced portions on a continuously moving web to substantially precisely the same depth. The depth of abrade can be preselected without lengthy trial-and-error adjustment, thus minimizing waste in a high throughput apparatus such as herein disclosed. However, if desired, the depth of abrade can be adjusted while the web is moving and without shutdown of operation. Circuitry is provided to effect shutdown of the apparatus if the wheel loads up or dulls to the point it cannot maintain the depth of abrade at at least a predetermined minimum.

Other features, objects, and advantages will become apparent from the following more detailed description of the invention and from the accompanying drawings, wherein:

FIG. 1 is a schematic perspective view of an apparatus embodying the invention;

FIG. 2 is an aperture card made by the apparatus of FIG. 1;

DESCRIPTION

Figure 3:
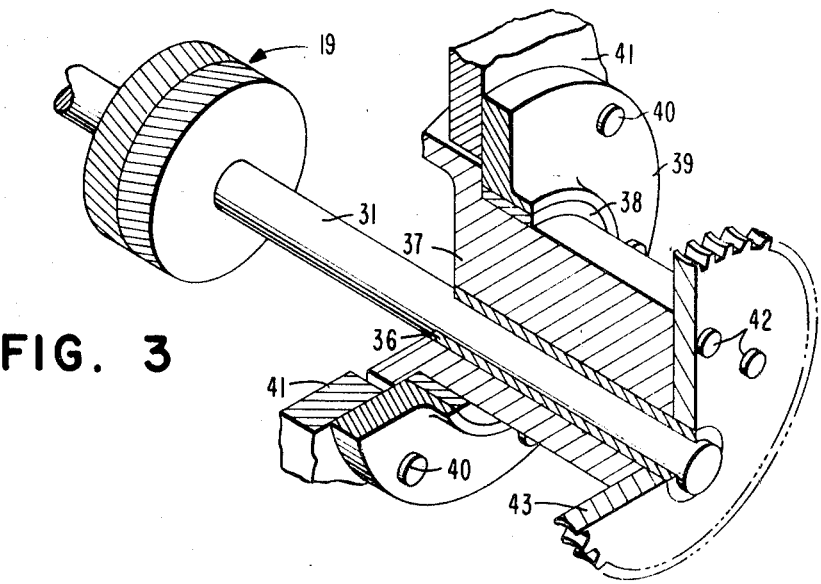
FIG. 3 is an enlarged perspective view, partly broken away, of a portion of the apparatus shown in FIG. 1.

As illustrated in FIG. 1, the invention is embodied in a high-throughput apparatus for abrading cardstock and cutting it into aperture cards of the type shown in FIG. 2.

This apparatus comprises a supply roll 10 from which a web 11 of cardstock is advanced under suitable tension and by rolls, such as 12, 13, 14, 15, around a die drum 16 that is suitably driven by means including a shaft 17. When a hollow rectangular die 18 on drum 16 passes an abrading wheel, such as 19, the wheel with the die as a backup will abrade a hollow rectangular trench or shoulder 20 in the web. The web will now be advanced by feed rolls 21, 21a past a tool station at which rolls 22, 22a will remove the unabraded portion surrounded by the shoulder 20. Thence the web may be advanced past successive print stations including print rolls 23, 23a and 24, 24a, respectively, and then to a cutoff station at which cutter rolls 25, 25a cut the web transversely into aperture cards 26, each of which (see FIG. 2) has an aperture 27 surrounded by an abraded shoulder 20 to which may be mounted in conventional fashion a film chip or the like (not shown). The cards 26 are advanced from rolls 25, 25a onto a drying drum 28 to which they are edge-clipped in conventional shingle fashion.

Figure 4:
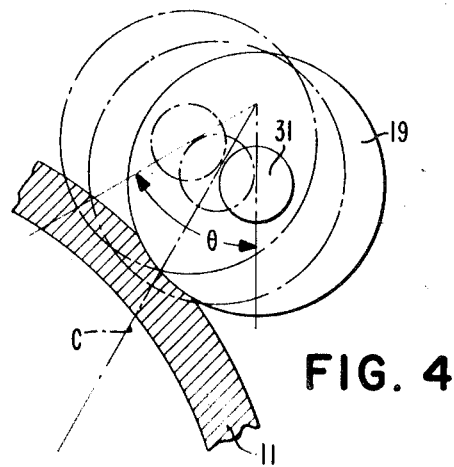
FIG. 4 is a schematic view showing relative arcuate positions of the drive shaft for the high speed tool shown in FIG. 1.

The composite abrading wheel 19 with V-shaped grooves is keyed to a shaft 31 that is driven from a three-phase synchronous motor 32 via drive pulley 33, belt 34, and idler pulley 35. Shaft 31 is rotatably supported in a bearing 36 (see FIG. 3) that is eccentrically disposed in an annular housing 37. Housing 37, in turn, is rotatably disposed in a needle bearing 38 that is carried by a collar 39 suitably secured, as by studs 40, to a fixed support 41. Butt connected, as by studs 42, to the end of housing 37 in coaxial relation therewith is a drive gear 43 that, as illustrated, overlies the end of eccentrically disposed shaft 31. Gear 43 is rotatable in either direction by a servomotor 44 acting through a worm 45. As shown in FIGS. 1 and 3 and schematically in FIG. 4, as worm 45 rotates gear 43 and hence housing 37 clockwise, shaft 31 and thus the abrading wheel 19 will be moved clockwise in an arcuate path a corresponding distance; but, in so doing, wheel 19 will be moved clockwise in an arcuate path a corresponding distance; but, in so doing, wheel 19 will be advanced but a small distance toward the surface of web 11 that is to be abraded. The arrangement thus far described, including the worm 45 and gear 43 and eccentrically mounted shaft 31, provides a compound reduction which desirably enables very precise control of depth of abrade.

It should here be noted that the portion of the shaft 31 between wheel 19 and pulley 35 is also supported within a bearing by a housing 37 rotatable within a needle bearing 38 that is carried by a collar 39 secured to fixed support 41. Movement of the shaft 31 arcuately a slight degree will be permitted by the inherent flexibility of the belt 34. To minimize the amount of variation in belt tension, however, the axis of pulley 33 should be so located that a line $c$ (FIG. 4) extending through the axes of pulleys 33, 35 would bisect the angle $\theta$ subtending the predetermined limits of angular movement of shaft 31.

According to the invention, rotation of the worm 45 and hence movement of the shaft 31 and wheel 19 arcuately in finely controllable amounts toward and away from the web 11 is controlled automatically by servomotor 44 in such manner as to maintain the wheel positioned to abrade the web to a preselected depth and perform a desired control operation (such as shut off the drives for the abrading wheel and web) under certain conditions. This is achieved as follows:

Three-phase synchronous motor 32 has windings 48, 49, 50. In series with the input lead to winding 50 is the primary winding of a transformer 51, the secondary 52 of which is connected via a diode 53 to a line 54, branches of which constitute respective one input leads to two similar comparator circuits 56, 57. The other output leads to circuits 56, 57 are connected to rheostats 58, 58a, respectively that, in turn, are shunt connected to a DC power supply 59. Line 54 is grounded through a resistor-capacitor network 55 to provide to circuits 56 and 57 a rectified voltage signal proportional in magnitude to the actual load on motor 32. The magnitude of this signal can be read on a voltmeter 55a. Rheostats 58, 58a provide two slightly different reference voltages preselected by the operator and corresponding to load magnitudes which effect desired maximum and minimum depths of abrade, taking into account the physical characteristics of the cardstock or other web material to be abraded.

For example, comparator circuit 56 may be of any suitable conventional type operative to provide in output lead 60 an uplevel (positive) signal only when the rectified voltage (corresponding to actual load on the motor 32 and indicative of actual depth of abrade) exceeds a preselected high voltage provided by a tap position along the rheostat 58 corresponding to a desired maximum acceptable depth of abrade (e.g., 0.0055 inch). On the other hand, the comparator circuit 57 may be of similar type (with or without an inverter according to the manner of hookup) and operative to provide in output lead 61 an uplevel (positive) voltage signal only when the rectified voltage corresponding to actual load and indicative of depth of abrade is less than a preselected low voltage provided by a different tap position along rheostat 58a corresponding to a desired minimum acceptable depth of abrade (e.g., 0.0051 inch).

Lead 60 is connected to one terminal of a relay 66, the other terminal of which is connected to ground. If and so long as a positive voltage signal is supplied via 56, 60 to relay 66, its normally open contacts 67a, 67b will be closed. This completes a circuit from a positive voltage source B+ via resistor 68, contact 67b, the reversible servomotor 44 and contact 67a to ground, for rotating the motor in one direction to cause the previously described mechanical drive system including worm 45 and gear 43 to move the abrader wheel shaft 31 counterclockwise as viewed in FIG. 4. This will retract the abrading wheel 19 in an arcuate path slightly from the web 11, reducing the depth of abrade, until the actual load and hence rectified voltage corresponding thereto is once again within the preselected range; whereupon the signal level in lead 60 will drop and thus deenergize relay 66 to stop servomotor 44.

On the other hand, and in similar fashion, a positive voltage signal supplied to lead 61 will energize a relay 69, thus closing its normally open contacts 70a, 70b to complete a circuit from voltage source B+ via a resistor 71, contact 70a, motor 44, and contact 70b to ground to rotate the motor in the other way. This will cause the mechanical drive system including 45, 43 to move the abrading wheel shaft 31 clockwise as viewed in FIG. 4, and thereby advance the abrading wheel 19 arcuately toward the web 11 to increase the depth of abrade until it is once again within said range, as determined by increased actual load on motor 32 as sensed via transformer 52, diode 53, etc.

It will thus be apparent that as long as the rectified voltage corresponding to actual load on motor 32 is within a range normally indicative of the depth of abrade being within the preselected range (illustratively assumed herein as between 0.0055 inch and 0.0051 inch), no relay-energizing signal will be supplied to either line 60 or 61, thereby to preclude hunting of the servomotor 44; i.e., said motor will remain inoperative and thus cause the setting of the abrading wheel 19 relative to the web 11 to remain constant as long as actual depth of abrade as indicated by actual load is within the preselected range.

Assume now that the abrading wheel 19 loads up or that for any other reason the normal calibrated relationship between actual load on motor 32 and depth of abrade should no longer hold true; e.g., actual load is high but actual depth of abrade is less than it should be for that actual load value. Means are provided and operative under such condition to initiate a desired control operation such as shutting off the abrading wheel drive motor 32 or activating a dressing unit (not shown) which will dress the abrading wheel 19 inline until the deviation is corrected.

This means comprises two similar comparator circuits 80, 81 each having its respective one input leads connected in parallel to a very sensitive optical transducer 83. Transducer 83 may be of the type known as an "Opt-O-Limit Electronic Indicator," marketed by Pratt & Whitney Measuring Systems Operation of Colt Industries, and comprising, briefly, two vertically spaced grills (not shown), having a plurality of equally spaced horizontal shutterlike slats. One grill is stationary. The other grill is mechanically movable vertically by a sensing roll 86 (FIG. 1) that rides on the surface of web 11, is slightly narrower than the width of one of the parallel longitudinally extending abraded trenches 87 (see FIG. 2) constituting one of the four trenches forming the abraded shoulder 20, and drops into trench 87 to create a peak signal of a magnitude proportional to actual depth of abrade; i.e., as web 11 rides over backing member 88, said other grill will move up and down as the unabraded and then abraded areas of the web pass under roll 86. As said other grill moves up and down, the amount of light which can pass through the "shutters" to a photocell (not shown) varies. The output from transducer 83 is connected to ground via a resistor-capacitor network 84 to thereby provide a voltage signal of a magnitude directly proportional to depth of abrade. The magnitude of this signal can be read on a voltmeter 85 that preferably is calibrated in terms of inches (mils) depth of abrade.

Each comparator circuit 80, 81 has its respective other leads connected to rheostats 89, 89a, respectively, that are connected in parallel with a DC power supply 90 to provide two reference voltages of selectable magnitude corresponding, respectively to maximum and minimum permissible depths of abrade (heretofore illustratively assumed as 0.0055 inch and 0.0051 inch, respectively). Comparator circuit 80 will provide in lead 91 an uplevel (positive) voltage signal only when the actual depth of abrade, as measured by optical transducer 83, respectively, is greater than the preselected maximum permissible depth as preestablished by one reference voltage setting of rheostat 89. Conversely, comparator circuit 81 will provide in lead 92 an uplevel (positive) voltage signal only when the actual depth of abrade, as measured by the optical transducer 83, is less than the minimum permissible depth as preestablished by the other reference voltage setting of rheostat 89a.

As will be apparent from FIG. 1, the optical transducer 83 does not sense actual depth of abrade of the web 11 until a certain time interval after the web has been abraded by wheel 19. This time interval would correspond to the distance along the web path from wheel 19 to roll 86 divided by the web velocity, plus the mechanical and electrical response delays of optical transducer 83, and minus the mechanical and electrical response delays of the servomotor 44. Said time interval should therefore remain substantially constant so long as web velocity remains constant. Accordingly, delay units 93, 94, such as delay lines, are interposed in branches of lines 60, 61, respectively, in order to delay, for this aforementioned time interval, the transmission of any signal from lines 60, 61 to lines 95, 96 leading to exclusive positive OR gates 97, 98, respectively. OR gate 97 will provide in line 99 an uplevel (positive) signal only if an uplevel signal is present in one or the other, but not both, of the lines 91, 95; and gate 98 will similarly provide in line 99 an uplevel signal only if an uplevel signal is present in one or the other, but not both, of the lines 92, 96. Line 99 is connected via a normally closed manually operable switch 100 to the positive terminal of a relay 101 having four normally closed contacts 102, 103, 104, 105. Contacts 102, 103, 104 form parts of circuits (not fully shown) via which current is supplied to the windings 48, 49, 50 of the three-phase motor 32 that drives the abrading wheel 19. Contact 105 forms part of a circuit (not fully shown) via which current is supplied to a motor 106 that provides the energy for the various drums and rolls that advance, print, cut and dry the web 11.

It will thus be apparent that in the embodiment illustrated, motors 32 and 106 will be shut down if and when relay 101 is energized as a result of any set of conditions resulting in a positive output signal from either exclusive positive OR gate 97 or 98. Under the aforementioned illustratively assumed conditions, such shutdown will occur under any one of six conditions; namely, when actual load on the abrading wheel 19 is high and yet the actual depth of abrade is within or below the preselected permissible abrade depth range; when actual load on the abrading wheel 19 is low and yet the actual depth of abrade is within or above said depth range; or when actual load on the abrading wheel is within the prescribed load range but actual depth of abrade is lower or higher than the permissible range. The time delay units 93, 94 assure that the motor load signal in line 60 or 61 will be deferred so as to come up in phase with the actual depth of abrade signal in line 91 or 92, respectively. Thus, if actual motor load increases to a degree providing an uplevel signal in line 60 and initiates operation of servomotor 44, the signal in line 95 will come up at the same time as the signal which should come up in line 91 to indicate that the actual measured depth of abrade is in fact above the preselected range. These simultaneous uplevel signals in both lines 95 and 91 indicate that the unit is operating properly; i.e., that the deviation indicated by circuit 60 has been verified and is undergoing correction.

Assume now that due to loading up of the abrader wheel 19, the load on motor 32 progressively increases to a degree that normally would correspond to a depth of abrade exceeding the preselected range; but the actual depth of abrade as sensed by the transducer 83 is within (or actually drops below) the preselected range. In either case, there will be no uplevel signal in line 91 at the time the delayed signal in line 95 comes up. Hence, relay 101 will be energized and perform the desired control operation, herein illustratively assumed as shutting down the motors 32, 106.

In similar manner, the desired control operation will be initiated if any of the other of the six enumerated conditions occurs, but will not be initiated if the deviation is being corrected. Thus the circuitry including 80, 81, 83 monitors the operation of the motor control circuitry including 56, 57, 66, 69.

Switch 100 is opened to prevent undesired energization of relay 101 during startup and/or calibration of the apparatus. During startup, any uplevel signal in line 91 or 92 will not be in phase with an uplevel signal in line 95 or 96 because the delay units 93, 94 defer the signals to 95 or 96 a fixed time interval which was computed on the basis of a constant web velocity corresponding to normal operating throughput.

Figure 5:
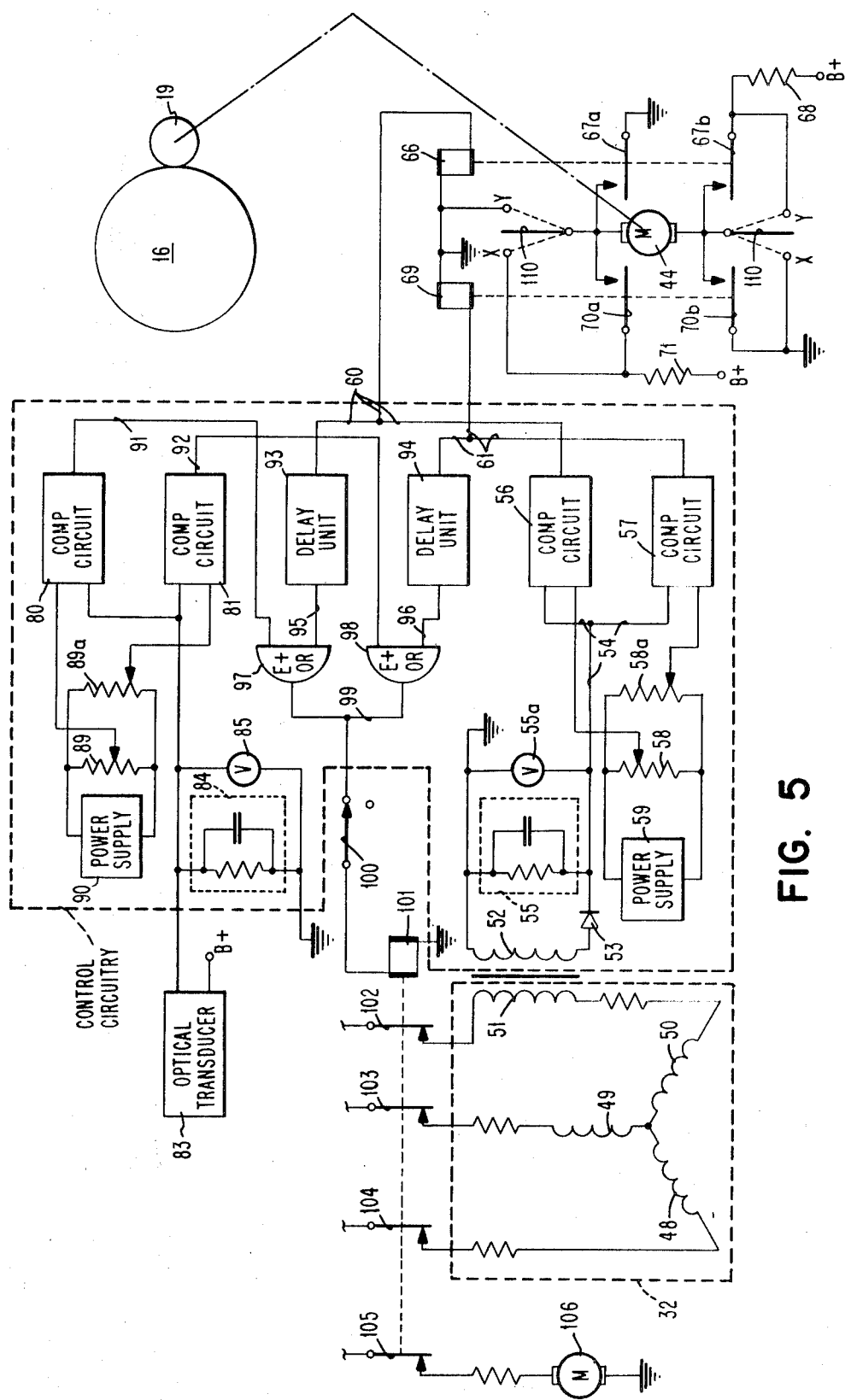
FIG. 5 is a schematic diagram of the electrical circuitry forming part of the apparatus of FIG. 1.

To calibrate the apparatus, the motors 32 and 106 are turned on to rotate abrading wheel 19 and start the web moving through its previously defined path and bring it to predetermined constant velocity. With switch 100 open, a manually operable normally open double-bladed bypass switch 110 is moved intermittently to position x (see FIG. 5). This completes a bypass circuit around relay contacts 70a, 70b for causing motor 44 to move the abrading wheel 19 inward toward the web until the depth of abrade as read on the calibrated voltmeter 85 and preferably verified by actual measurement by the operator attains the maximum permissible value (heretofore assumed as 0.0055 inch). Switch 110 is then opened; and the tap on rheostat 58 is moved up slowly until relay 66 becomes energized and thus defines the high reference voltage setting which, if and when exceeded, causes motor 44 to move wheel 19 outward.

Now switch 110 is moved intermittently to position y for bypassing relay contacts 67a, 67b to cause the abrading wheel 19 to move away from the web until depth of abrade as read on voltmeter 85 and operator verified attains the minimum permissible value (assumed as 0.0051 inch). Switch 110 is then opened and the tap on rheostat 58a is moved down slowly until relay 69 becomes energized and thus defines the low reference voltage setting below which wheel 19 will be moved inward to abrade deeper.

A voltmeter (not shown) calibrated like and identical with voltmeter 85 is applied by the operator to adjust the voltage between the particular tap and ground reference until the settings of the taps for rheostats 89, 89a give the permissible calibrated readings of 0.0055 inch and 0.0051 inch, respectively.

Switch 100 is then closed. The apparatus will now function automatically to maintain the depth of abrade within the preselected limits, with the optical transducer 83 and related circuitry operating to monitor the operation of the load-controlled circuitry. This will, among other things, prevent overload of the motor 32 such as could occur if the optical transducer 83 were used as the sole control for the servomotor 44 and the abrading wheel 19 loaded up to a point where an excessive load was placed on motor 32 as it attempted to maintain the desired depth of abrade.

In the preferred embodiment illustrated, only the final or finish abrading operation is performed by abrading wheel 19. At least one additional abrading wheel, such as 111, is provided to remove some of the web stock by rough partial abrading for more precise abrading depth control. If used, the wheel 111 should preferably be driven clockwise as illustrated in FIG. 1; i.e., in the opposite direction from the finish wheel 19. Depth of abrade of the rough abrading wheel 111 may be manually controlled. The servocontrolled circuitry herein described need be associated only with the final or finish abrading wheel 19.

Figure 6:
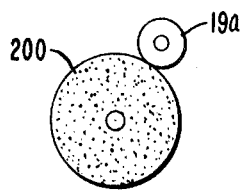
FIGS. 6 and 7 are schematic elevational views illustrating additional applications of the apparatus embodying the invention.
Figure 7:
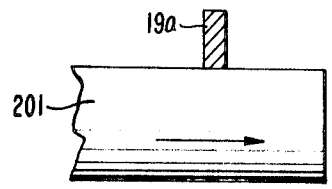

If desired the configuration of the die on drum 16 may be modified to cause wheel 19 to abrade any desired repetitive pattern (such as a trademark, or an antiforgery symbol difficult to reproduce) either intermittently at predetermined intervals along the web or continuously (such as one continuous trench). Or some other type of high speed rotary tool (such as a grinding wheel) may be substituted for the abrading wheel and the die 18 eliminated. Furthermore, as illustrated schematically in FIGS. 6 and 7, a rapidly rotating tool 192 (corresponding to 19) may be used to dress a rotating workpiece (such as a grinding wheel 200) or a longitudinally moving workpiece (such as a steel beam 201). The apparatus thus has a wide variety of uses and is not limited to aperture card manufacture or use with webs or a relatively slower rotating backup member like drum 16.

It will be apparent that the foregoing and other changes may be made without departing from the spirit, scope, and teaching of the present invention. Accordingly, the apparatus disclosed herein is to be considered merely as illustrative, and the scope of the invention is to be limited only as specified in the claims.

1. Apparatus for controlling positioning of a rapidly rotating machine tool relative to a work surface, said apparatus comprising
   means providing corrective signals whenever actual load on the tool varies from a predetermined load corresponding to a desired position of the tool relative to the surface,
   means responsive to said corrective signals to effect relative movement of the tool toward and away from the surface and ineffective to cause such movement in the absence of such signals,
   monitoring means, including tool position sensing means, providing other signals only when actual position of the tool varies from the desired position, and
   means controlled by said corrective signals and other signals and operative to initiate a preselected control operation whenever the corrective signals indicate corrective action is being taken but there is an absence of other signals indicating a condition requiring correction, and vice versa.

2. Apparatus according to claim 1, wherein said means providing corrective signals comprises
   motor means for rotating the tool,
   means providing a rectified voltage signal proportional to magnitude of input current to the motor means and hence indicative of actual load on the tool,
   operator adjustable means providing two selectable voltage signals corresponding, respectively, to maximum and minimum predetermined loads defining the desired position of the tool as a permissible range,
   comparator circuit means for comparing said rectified signal with a respective one of said selectable signals, for providing one corrective signal or another corrective signal according to whether actual load is above or below said maximum and minimum, respectively, and providing no corrective signals if between said maximum and minimum.

3. Apparatus according to claim 2, wherein said means responsive to said corrective signals comprises
tool support means,
reversible motor means for moving the support means and hence the tool relative to the surface, and
circuit means responsive to said one corrective signal and other corrective signal to drive the reversible motor means one way and other way, respectively, for moving the tool away from and toward the surface, thereby to restore the tool to within said permissible range of positions.

4. Apparatus according to claim 1, wherein said monitoring means comprises
means providing an analog signal corresponding to actual position of the tool relative to the surface,
operator-adjustable means for providing two selectable analog signals corresponding, respectively, to the closest and farthest permissible positions of the tool relative to the surface to thereby define the desired position as a range, and
comparator circuit means for comparing the first mentioned analog signal with said selectable analog signals for providing said other signals only when actual position is outside such desired range.

5. Apparatus according to claim 1, including
delay means for delaying transmission of said corrective signals to said controlled means for a period of time corresponding to the time interval between generation of the corrective signals and generation of the other signals at conclusion of the actual position sensing operation.

6. Apparatus for controlling positioning of a rapidly rotating machine tool relative to a work surface, said apparatus comprising
means providing high and low corrective signals whenever actual load on the tool respectively exceeds or is less than a predetermined load range corresponding to a desired position range of the tool relative to the surface,
means responsive to said high and low corrective signals to effect relative movement of the tool away from and toward the surface, respectively,
monitoring means, including tool position sensing means, providing other high and low signals only when actual position of the tool is respectively closer to or farther from the surface than the desired position range, and
means controlled by said corrective signals and other signals and operative to initiate a preselected control operation responsive to a predetermined undesirable operating condition as denoted by either of said corrective signals being up while neither of said other signals is up, or either of said other signals being up while neither of said corrective signals is up.

7. Apparatus according to claim 6, wherein the last-introduced means comprises
one gate having said high corrective signal and other high signal as its inputs, and
another gate having said low corrective signal and other low signal as its inputs, each of said gates being operative to selectively initiate the control operation only when one of their inputs is up but not both or neither of their inputs are up.

8. In combination,
a shaft,
a tool rotatably driven by the shaft and adapted to engage a work surface,
bearing means within which the shaft is eccentrically supported,
other means including gear means for effecting minute variations in rotative position of said bearing means to thereby move the shaft and tool in an arcuate path toward and away from the surface, and
servo means including
means providing signals, proportional, respectively, to actual load on the tool and to a predetermined load corresponding to a desired position of the tool relative to the surface, and
means controlled by said signals and operative to control said other means as necessary to maintain actual load equal to said predetermined load, thereby to maintain said tool at said desired position relative to the work surface.

9. The combination according to claim 8, including
means including a motor for driving the shaft, and wherein
one of said signals is continuous and proportional to a rectified voltage corresponding to the magnitude of the input current to the motor, and
the other signal is continuous and proportional to a reference voltage selectable by an operator and predetermined according to the physical characteristics and desired depth of penetration of the surface.

10. The combination according to claim 9, including
means for providing a third signal proportional to the depth of penetration of said surface, and
means for initiating a desired control operation responsively to said one signal exceeding a preselected value concurrently with said third signal falling below another preselected value, thereby to initiate the control operation when for any reason the tool can no longer maintain the desired depth of penetration without excessive load on the tool.